United States Patent
Wallace

(10) Patent No.: US 6,822,946 B1
(45) Date of Patent: Nov. 23, 2004

(54) WIRELESS BRIDGE FOR A BROADBAND NETWORK

(75) Inventor: Robert Wallace, Portsmouth, RI (US)

(73) Assignee: Motorola, Inc, Schaumburg, IL (US)

( * ) Notice: Subject to any disclaimer, the term of this patent is extended or adjusted under 35 U.S.C. 154(b) by 751 days.

(21) Appl. No.: 09/645,659

(22) Filed: Aug. 24, 2000

(51) Int. Cl.[7] .................................................. H04Q 7/00
(52) U.S. Cl. ..................................................... 370/328
(58) Field of Search ................................. 370/338, 352, 370/401, 442, 469, 478, 277, 535, 466, 314, 228, 468, 261, 328, 480, 445, 351, 402–404; 709/236, 248; 714/31, 455, 504, 507, 448, 422.1; 713/400, 600, 502, 501, 500; 710/311; 375/219, 220

(56) References Cited

U.S. PATENT DOCUMENTS

| | | | | |
|---|---|---|---|---|
| 4,792,946 A | * | 12/1988 | Mayo | 370/245 |
| 5,757,265 A | * | 5/1998 | Kogure et al. | 340/310.01 |
| 6,005,884 A | * | 12/1999 | Cook et al. | 375/132 |
| 6,032,261 A | * | 2/2000 | Hulyalkar | 713/400 |
| 6,445,690 B2 | * | 9/2002 | Sato et al. | 370/338 |
| 6,445,691 B2 | * | 9/2002 | Sato | 370/338 |
| 2002/0012358 A1 | * | 1/2002 | Sato | 370/466 |

* cited by examiner

Primary Examiner—Dang Ton
(74) Attorney, Agent, or Firm—Esteban A. Rockett; Karin L. Williams

(57) ABSTRACT

An IEEE 1394 compliant wireless bridge for connecting local area network segments in multiple rooms. A pair of transceiver units each comply with IEEE 1394 for connectivity and communication with local area network devices. The transceiver units operate using high frequencies and low power levels over very short ranges to communicate data and control signals between rooms. Transmissions are short range and highly directional and thereby do not interfere with other local transmissions.

12 Claims, 2 Drawing Sheets

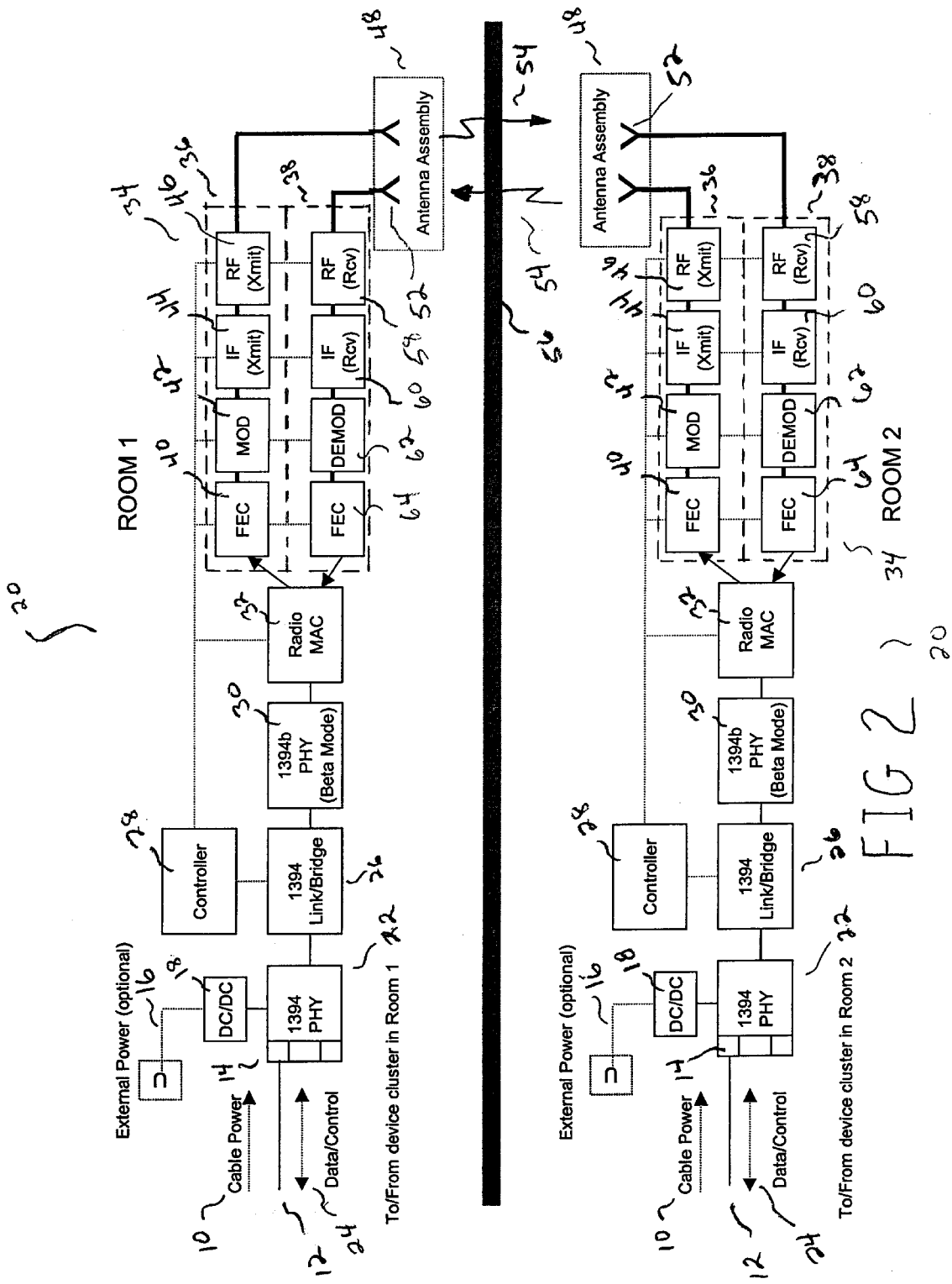

WIRELESS BRIDGE FOR A BROADBAND NETWORK

BACKGROUND OF THE INVENTION

The present invention relates to communication of electronic signals within a network and more particularly to a method and apparatus for wireless communication of broadband signals between separate network segments.

An increasing variety of household devices that require communication links with other devices in homes are leading to home networks having increased complexity and an undesirable proliferation of wiring. Broadband links which facilitate transmission of high quality audio and video signals through the internet and through home networks are creating substantial improvements in home communication and entertainment devices. Various means are being developed to combine the various communication technologies and simplify home networks.

Various home networking systems have been developed to minimize wiring and complexity. For example, several systems provide network connectivity between home devices which use existing phone wires or power wires within the home as a network backbone. These systems are sometimes referred to as "no new wires" systems. Other home networking systems broadcast data throughout the local area using radio frequency transmitters.

At least one consortium of industry groups, for example the Home Phone Network Alliance or Home PNA, was formed to develop a protocol for telephone wire home networks. Home PNA systems typically operate in the 1 Mbps–10 Mbps range which is too slow for many high bandwidth applications. New phone wires must often be installed to facilitate Home PNA networks connections because consumers often desire network connections in rooms which previously had no telephone connections. Many Home PNA devices also require separate power connections. Therefore, many new wires are often required to implement these "no new wires" networks.

Home PNA is not capable of transporting mixed asynchronous and isochronous signals. Digital video and other real-time broadband signals must communicate in isochronous mode whereby data packets must be received within precise time intervals. Other communication signals including data transmissions to computer printers and certain control signals are time independent (asynchronous). Many digital audio and video devices will require mixed isochronous and asynchronous data transport.

Networks have been developed which communicate electronic signals over existing electrical power wires in the walls of homes. Such networks are also incapable of mixed asynchronous and isochronous broadband data transport and are therefore unsuitable for use with many digital audio and video devices.

Wireless communication links between devices are necessary to minimize the need for installing an increasing web of communication wires, cables or fibers throughout homes and within the walls of homes and other structures. Installation of additional communication wires throughout homes is economically and environmentally wasteful. Furthermore, consumers are reluctant to purchase electronic devices which will require new wiring.

Wireless home networks have been developed which facilitate communication between multiple computers and peripherals. Typical wireless home network devices are linked by radio transceivers which communicate over distances over 150 ft. The signals used in wireless home networks are typically broadcast with out directionality and therefore require relatively high power levels. The bandwidth and data transmission capacity of such signals is therefore limited. Such networks are typically slower than standard ethernet networks and are not capable of high data transmission rates that will be required for multiple high quality video signals.

The Institute of Electrical and Electronic Engineers (IEEE) developed standard IEEE 1394 to facilitate efficient communication between electronic devices and to provide minimum connections and setup requirements. IEEE 1394 is incorporated herein by reference in its entirety. One well known embodiment of the IEEE 1394 standard is the FireWire bus which is used and marketed by Apple Computer Incorporated.

IEEE 1394 networks are capable of communicating broadband signals at a rate of up to 400 Mbps (mega-bits per second). Such bandwidth is sufficient to transport multiple digital video and audio signals simultaneously. IEEE 1394 networks are also capable of transporting mixed asynchronous and isochronous data and are therefore well suited for use with many digital video and audio devices.

Devices complying with IEEE 1394 including many televisions, video cassette recorders, video cameras, personal computers and peripherals, games and entertainment systems may now communicate with each other using digital signals over a common network. Any IEEE 1394 compliant devices may be plugged into any other compliant device without requiring any central hub. The 1394 architecture thereby provides for networks having a branching structure. All devices on the network are required to be hot-pluggable and self configuring using a standard cable and connectors. The standard cable and connectors carry power as well as communication signals.

Data routing capability is provided in each IEEE 1394 device. Address assignment and network configuration automatically occurs each time a device is plugged to or unplugged from the network. Devices provide self descriptive attribute data to the network. Device addresses and attribute data are associated with communication data packets and the packets are automatically routed to the proper receiving devices.

Although IEEE 1394 networks provide minimized use of power wires and communication cables, such networks still require at least one cable between each device. This presents a problem when the network expands into more than one room. An IEEE 1394 standard cable must typically be routed through walls, ceilings or doorways to connect networked devices in different rooms. A heretofore unmet need exists for a wireless link in home networks to provide a bridge between network segments located in different rooms or spaces.

A major shift is taking place within the home with the introduction of devices, for example, multimedia broadband-capable personal computers, advanced TVs, digital set-top boxes, digital satellite receivers, digital video disk players and game players that support digital video integrated with internet based information. Many of these devices will be marketed in the future as being home networking capable (i.e. will provide a networking stack that allows these devices to control each other and send/receive streaming media at a minimum). The network stack will provide a common interconnection (based on IEEE 1394) for these home network capable devices. The set of specifications associated with IEEE 1394 offer cabling strategies that work well in new home construction where category 5 twisted pairs are being installed as part of the structured wiring of the home. But in older homes and for the ultimate interconnect flexibility, a cost-effective wireless or "no new wires" interconnect is desired by the consumer.

Several wireless and/or "no new wires" approaches have been proposed to address the home networking needs of the consumer. Each of the proposed solutions have there own set of problems. For example, "no new wires" solution such as HomePNA and power-line technologies do not support the mixed broadband isochronous and asynchronous transport requirements of the new digital video and audio devices. Not every home has a phone connection in all of the rooms where broadband home networking would be needed; thus requiring the new wiring that the "no new wires" strategy is trying to avoid. AC powering of some of the wireless approaches becomes a problem for wide scale acceptance by the consumer. Consumers do not like a large number of wall powered devices that they must deal with today.

Many strategies are targeted at connecting two PCs and an access network device to form a home network for internet and PC peripheral sharing. These types of home networks do not provide the kind of interconnections that are needed in a true broadband home network. Many of the wireless approaches attempt to support "home wide" data transport via complex collision based multiple access mechanisms. Performance limitations make these solutions unusable for broadband home applications.

In addition, consumers desire to purchase home networking technology in an incremental manner. For audio/video home networking, this requires a technology that can cost effectively interconnect audio/video equipment within a room (e.g., using IEEE-1394 cables in a manner that RCA cables are used today). Consumers further desire to extend those interconnections into another room where they would connect into another cluster of audio/video and/or computer equipment. The consumer should thereby be required to purchase only the components they need.

BRIEF SUMMARY OF THE INVENTION

Accordingly, the method and apparatus according to the present invention provides high bandwidth communication in compliance with the IEEE 1394 standard. At least one embodiment of the present invention provides transmission of data over distances which may include transmission through walls or floors of a home or office building. Transceiver units may be provided in matched pairs having pre-programmed frequency allocations. Alternatively, transceiver units may internally scan the environment to determine which frequencies are being used and select an appropriate unused frequency.

In at least one embodiment a first transceiver unit is mountable to a location on a first side of a wall and a second transceiver unit is mountable to an aligned location on a second side of a wall. The transceiver units include electronic circuits which comply with IEEE 1394 Link/Bridge specification and each include cables and connectors for attachment to networked components within the room where they are located. The method and apparatus of the invention thereby provides a wireless bus bridge between rooms for connecting the various components of an IEEE 1394 network. All of the advantages of the IEEE 1394 bus structure are provided to multiple rooms or spaces without requiring a wire or cable to pass through or around the wall or obstacle between the spaces.

An exemplary embodiment of the present invention communicates using frequencies in the 2.4 GHz to 5.0 GHz band and low power levels in the sub 1 watt range. The low power levels combined with the directional nature of communication between transceivers prevents interference with other wireless devices in the local environment. In at least one embodiment of the present invention, the transceiver units derive power from the IEEE 1394 standard power connections. However, other embodiments exist having external power connections to provide power in a room where all other devices connected to the network may be passive.

High bandwidth mixed asynchronous and isochronous data transport is provided by compliance with the IEEE 1394 specification and allows transmission between multiple multimedia devices. Only signal packets which are addressed to a device that is connected to a particular transceiver are transmitted thereto. Valuable bandwidth is thereby used most efficiently.

One advantage of the present invention is to provide a method of expanding a high bandwidth network of devices throughout a plurality of rooms without requiring wires or cables to pass between the rooms. Another advantage of the present invention is to provide a low power, directional, wireless link between electronic devices which is capable of transferring high bandwidth data. Still another advantage of the present invention is to provide wireless links in an IEEE 1394 network which is not susceptible to degradation by locally radiated electromagnetic interference and which does not contribute significantly to electromagnetic noise in a local environment.

The present invention serves an unmet need for a hybrid wire/wireless home networking scheme based on IEEE-1394-1995 (shielded cabling) and IEEE 1394b (category 5 twisted pairs or fiber). In some limited cases this interconnect could be extended between rooms at the consumers option. Connections between rooms are wireless but connections within a room are wired. Thus, the wireless interconnection system of the present invention thereby does not cover an entire house. This is modeled after the current approach consumers use in wiring a phone extension today. For example, consumers run phone wire from a convenient phone jack in one room to the room where they want a new extension. As each room is interconnected in this manner, devices and their services become available to other devices on the home network A system according to the present invention may thus form a "tree topology" of an IEEE 1394 bus system using a hybrid wired/wireless strategy.

BRIEF DESCRIPTION OF THE DRAWINGS

FIG. 2 illustrates a schematic block diagram of at least one embodiment according to the present invention.

DETAILED DESCRIPTION OF THE INVENTION

Figure 1:
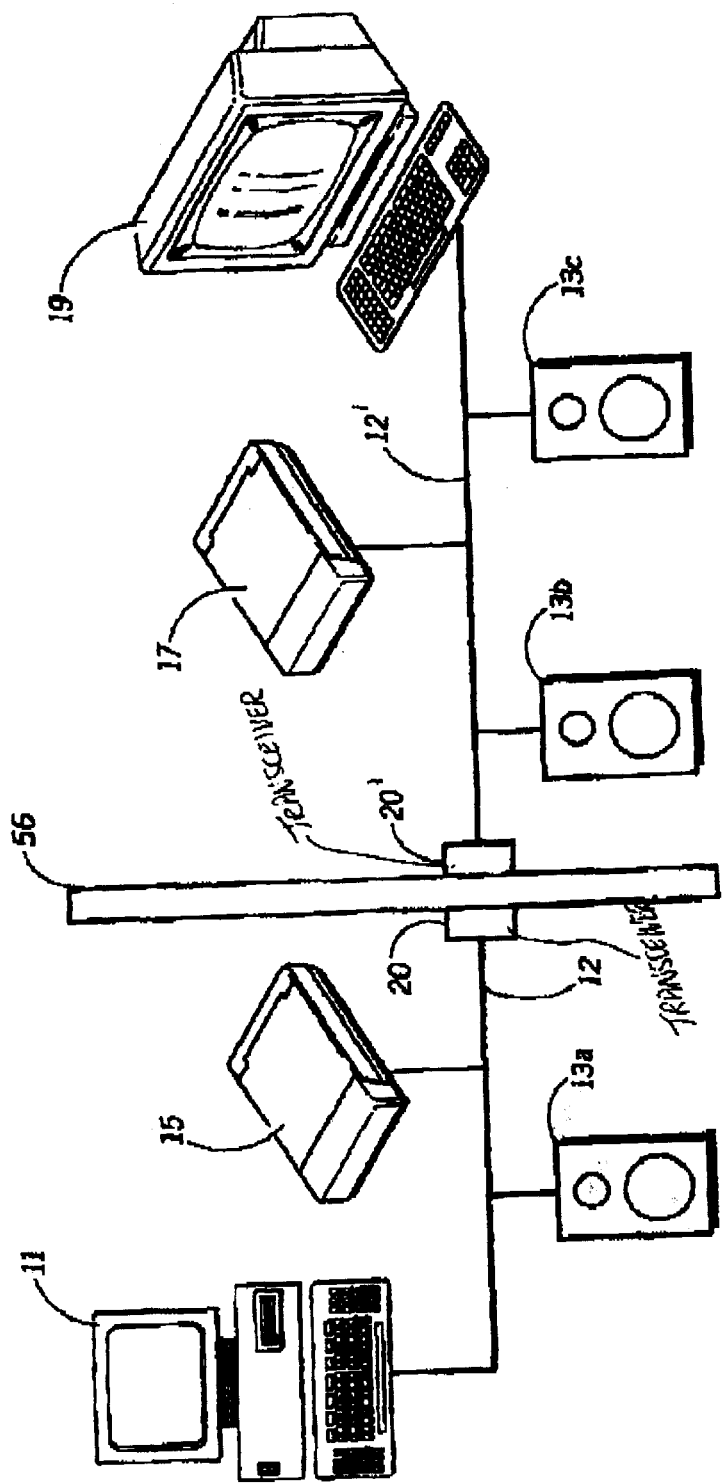
FIG. 1 illustrates the present invention in an example network.

FIG. 1 illustrates an example of the present invention as used to bridge two separate networks 12 and 12' which are isolated by a barrier 56 such as a wall. Network 12 has three devices on it, a computer 11, data storage system 15, and a loudspeaker 13. In a separate room, network 12' has four devices on it, a video player 17, are television 19 and two more loudspeakers 13. Normally, for using one network in both rooms, the wire would need to be routed in some circuitous fashion around the wall 56, or a hole needs to be cut in the wall 56 to allow the cable to pass through. The present invention avoids this by providing a set of transceivers 20 which transmit and receive the data between the networks 12 and 12', and effectively bridging them to form one common network 12. Now communications and data can be easily moved between the two rooms separated by the wall 56. For example, the loudspeakers 13b and 13c can play music sent out by the computer 11, and the data storage unit 15 can capture streaming video transmitted by the video player.

The present invention is extremely easy to set up and use. The transceivers 20 are simply placed on opposite sides of the barrier 56, with the transceivers 20 facing each other, and the network 12 and 12' in each room are plugged into the appropriate transceiver 20 and 20', using a standard plug. The transceivers automatically configure and set up communications, and the installation in complete.

FIG. 2 illustrates at least one embodiment according to the present invention. It can be seen by reference to FIG. 1 that power may be provided to a transceiver unit by a standard pair of power wires 10 included in an IEEE 1394 cable 12 and connected thereto by a standard IEEE 1394 connectors 14. The IEEE 1394 standard bus thereby provides means to share power between devices and minimize the number of power cords needed in a room. Optionally, an external power cable 16 may be used to provide power in rooms, for example, where no other networked devices are connected to external power. A DC/DC converter 18 provides power to the transceiver device 20 in embodiments having external power connections 16.

Power is delivered to the physical layer 22 of the IEEE 1394 bus. The physical layer 22 is defined by IEEE 1394a-2000 and draft 1.0 of IEEE 1394b specifications which are both incorporated herein by reference. The physical layer 22 provides the electrical and mechanical connections between an IEEE 1394 device, the transceiver unit 20, and the IEEE 1394 cable 12. Data and control signals 24 are provided to a device through a standard IEEE 1394 cable 12 and connected to the physical layer 22. The physical layer 22 also provides several functions as defined by the IEEE 1394 specification, including bus arbitration, encoding/decoding, data synchronization, signal leveling and connection state indication.

The IEEE 1394 link/bridge 26 is electrically connected to the physical layer 22. The IEEE 1394 link/bridge 26 and its functions are defined in IEEE 1394a-2000 and IEEE 1394b. Link layer functions include packet transmission, packet reception, isochronous talk and listen functions and cycle control.

A controller 28 is electrically connected to the IEEE 1394 link/bridge and includes a micro-controller and memory. The controller 28 provides overall transceiver device 20 control including initialization, configuration, frequency re-use and status monitoring.

An IEEE 1394 beta mode physical interface 30 is also electrically connected to the link/bridge block 26. The IEEE 1394 beta mode physical interface 30 supports long distance transport using an 8 bit/10 bit encoding scheme.

A radio media access control layer 32 is electrically connected to the beta mode physical interface 30. The radio media access control layer 32 provides radio technology specific data link management and control.

Each transceiver includes at least one radio circuit 34 including a transmitter circuit 36 and a receiver circuit 38. The transmitter circuit 36 includes a forward error correction circuit 40 which is electrically connected to the radio media access control layer 32. The forward error correction circuit 40 provides radio technology specific data encoding to reduce and recover from transmission errors.

The transmitter circuit 36 also includes a modulator circuit 42 which is electrically connected to the forward error correction circuit 40; an intermediate frequency stage 44 which is electrically connected to the modulator circuit 42; and a radio frequency stage 46 which is electrically connected to the intermediate frequency stage 44. The radio frequency stage 46 is electrically connected to an antenna assembly 48.

Data packets are communicated from the radio media access control layer 32 and then sequentially communicated to the forward error correction circuit 40, the modulator circuit 42, the intermediate frequency stage 44, the radio frequency stage 48 and then to the antenna assembly 48. It can be seen in FIG. 2 that the controller 28 is electrically connected to the radio media access controller 32 and also to each of the radio circuit 34 blocks. Broadband signals are thereby transported from an IEEE 1394 cable 12 that is connected to at least one 1394 network device in one room and transmitted toward a receiving antenna in a second transceiver unit 20 which is typically disposed in another room. The IEEE 1394 standard enables compliant devices to store network status information so that only data packets having a destination along any particular branch of a network are transmitted along to that branch. The transceiver unit 20 according to the present invention therefore transmits only the data and control signals having destinations on network segments that are attached to the receiving transceiver. It should be noted that the transceiver units 20 of the present invention are also destinations for certain data and control signals.

The transmitted signals propagate through intermediate barriers, typically a wall or ceiling, toward a receiving antenna assembly 48 in a cooperating transceiver unit 20. The transceiver units 20 are preferably mounted to align the antenna assemblies 48 and direct them toward each other. The receiver circuits 38 function essentially as transmitter circuits 36 in reverse. Data and control signals are received by an antenna assembly 48 in the cooperating transceiver unit 20. The receiving antenna 52 is electrically connected to the receiver circuit 38 segment of the radio circuit 34 in the second or cooperating transceiver 20. The received signals travel from the antenna assembly 48 to the receiver radio frequency stage 58 then to the receiver intermediate stage 60 and further to the demodulator circuit 62. From the demodulator circuit 62, the signals are passed through the receiver forward error correction circuit 64 and then to the radio media access control layer 32. The radio media access controller 32 is responsive to instructions from the controller 28 and sends data packets along to the IEEE 1394b beta mode physical interface 30. The IEEE 1394b beta mode physical interface 30 passes the signals along to the IEEE 1394 link/bridge 26. The IEEE 1394 link bridge is controlled by the controller 28 and passes the appropriate signals along to the physical layer 22 which passes the signal on to a standard IEEE 1394 cable 12 and connector. The physical layer 22 provides a power interface with the IEEE 1394 network or with a DC/DC converter 18 to accept external power and a also provides a signal interface with the network.

The preferred embodiments of the present invention will comply with the IEEE 1394 specification by including specified connector ports and dimensions and by including specified functionality.

Transceiver units according to the present invention may communicate over a fixed pre-selected frequency. Such fixed frequency embodiments may be most appropriate, for example, to be manufactured and installed as matched pairs. A typical embodiment of the present invention will communicate in the 2.4 GHz band or the 5.0 GHz band. If the pre-selected frequency causes excessive errors, the transceivers may then select alternate frequencies.

In at least one embodiment of the present invention, the controller of one transceiver unit is configured to periodically scan a range of communication frequencies and determine which frequencies are available or most appropriate for communicating with its cooperating transceiver unit. Such an embodiment may be configured to perform such a scan each time the transceiver unit is connected to the network, when the network is powered up or whenever any other device is connected to or removed from the network. The transceivers of the present invention preferable communicate by transmitting and receiving signals on separate frequencies to allow for full duplex, however they may alternatively use a single carrier frequency for both transmitting and receiving.

An exemplary embodiment of the present invention will transmit at a power level of less than one watt and may select a power level which is most appropriate for a specific desired bit error rate. A typical embodiment will include a housing having a flat planar antenna mounted inside the housing. A person of ordinary skill in the art will recognize that a variety of antenna system configurations may be used to transmit and receive data over short distances at low power levels. Any number of antenna configurations may be used in the present invention.

An exemplary, embodiment of the present invention will typically be configured to transmit data for reception at a distance of approximately one meter. Still other embodiments of the present invention are configured to transmit data for reception at a distance of up to 8 meters.

A person of ordinary skill in the art will recognize that a housing for the transceiver units 20 may be minimized or eliminated in certain embodiments to reduce size and material usage. The IEEE 1394 specification requires specific connector dimensions which will limit the extent to which the housing or package size may be reduced. The housing of an exemplary embodiment may incorporate any type of mounting features such as mounting holes, flanges or double sided tape to facilitate mounting each transceiver unit in a fixed location for alignment with a cooperating transceiver unit 20.

In a typical embodiment of the present invention, power is provided by power conductors in the standard IEEE 1394 cable 12. By providing such power wires 10 along with the data connections in the IEEE 1394 standard cable 14, IEEE 1394 minimizes the number of power wires in a room. A single network device in each room may provide the only external power connection, for example to an AC outlet, which is then shared through the network connections to all other devices in the room. Another embodiment of the present invention may include an external power cable 16 for power where none of the other network devices in a room have external power connections.

In at least one embodiment, a carrier signal is modulated using quadratic amplitude modulation (QAM) techniques. In another embodiment orthogonal frequency domain multiplexing (OFDM) is used.

Although described in terms of the IEEE 1394 standard for data communications, the present invention may be used for any communications standards or techniques, including ethernet, telephony (whether analog or digital), WAN, token ring, USB etc. Further, the present invention may be used in any location and type of building, such as factories and businesses. Further the present invention can be used to bridge over open space, such as across an open room, as well as passing through barriers such as a wall or ceiling.

Although exemplary embodiments have been described, other embodiments and modifications of the invention are intended to be covered by the spirit and scope of the appended claims.

I claim:

1. A wireless data bridge apparatus for bridging a network, comprising:

a connector port to connect to a segment of said network, said connector port to send data to and receive data from said network segment;

a controller, in electrical communication with said connector port, said controller to process data to and from said network segment;

a radio circuit, in electrical communication with said controller, to modulate data from said controller and to demodulate data to said controller;

an antenna assembly, in electrical communication with said radio circuit, said antenna assembly to transmit signals received from said radio circuit, and to receive signals which are sent to said radio circuit;

wherein said apparatus transmits and receives signals with a similar apparatus connected to another segment of said network, and further wherein said controller is capable of scanning a local environment and selecting an unused frequency and wherein said controller is configured to cause said radio circuits to communicate using said unused frequency.

2. The apparatus according to claim 1 wherein said apparatus complies with standard IEEE 1394.

3. The apparatus according to claim 1 wherein said radio circuit communicates using a 2.4 GHz frequency band.

4. The apparatus according to claim 1 wherein said radio circuit communicates using a 5.0 GHz frequency band.

5. The apparatus according to claim 1 wherein said apparatus communicates using preset frequencies.

6. The apparatus according to claim 1 further comprising an external power cable electrically connected to said apparatus.

7. A wireless data bridge apparatus having a transceiver unit comprising:

a connector port having power conductors and data conductors disposed within said at least one connector port, wherein said connector port is connectable to a local area network;

at least one controller in communication with said connector port, said controller including a memory member and a micro-controller member, a radio circuit in communication with said controller;

an antenna assembly in communication with said radio circuit;

wherein said bridge apparatus transports bi-directional data across a wireless boundary from one segment of said local area network to another segment of said local area network, and further wherein said controller is capable of scanning a local environment and selecting an unused frequency and wherein said controller is configured to cause said transmitter circuit and said receiver circuit to communicate with each other using said unused frequency.

8. The apparatus according to claim 7 wherein said apparatus complies with standard IEEE 1394.

9. The apparatus according to claim 7 wherein said transmitter ircuits and receiver circuits communicate using a 2.4 GHz frequency band.

10. The apparatus according to claim 7 wherein said transmitter circuits and receiver circuits communicate using a 5.0 GHz frequency band.

11. The apparatus according to claim 7 wherein said transceiver units communicate with each other using preset matched frequencies.

12. The apparatus according to claim 7 further comprising an external power cable electrically connected to at least one of said transceiver units.

* * * * *